United States Patent
Polisetty et al.

(10) Patent No.: US 10,353,799 B2
(45) Date of Patent: Jul. 16, 2019

(54) TESTING AND IMPROVING PERFORMANCE OF MOBILE APPLICATION PORTFOLIOS

(71) Applicant: ACCENTURE GLOBAL SOLUTIONS LIMITED, Dublin (IE)

(72) Inventors: Raghu Polisetty, Medak (IN); Bibin George Thottikkara, Bangalore (IN); Subhasish Roy, Bangalore (IN); Marin Grace, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/693,079

(22) Filed: Aug. 31, 2017

(65) Prior Publication Data
US 2018/0143891 A1    May 24, 2018

(30) Foreign Application Priority Data
Nov. 23, 2016   (IN) ............................. 201641010088

(51) Int. Cl.
G06F 9/54        (2006.01)
G06F 11/07       (2006.01)
(Continued)

(52) U.S. Cl.
CPC ...... *G06F 11/3612* (2013.01); *G06F 3/04817* (2013.01); *G06F 9/542* (2013.01);
(Continued)

(58) Field of Classification Search
CPC ............. G06F 11/3452; G06F 11/3466; G06F 11/3476; G06F 11/3612; G06F 11/3616;
(Continued)

(56) References Cited

U.S. PATENT DOCUMENTS 6,917,921 B1 *  7/2005  Cimral ................... G06Q 10/06
                                                      705/7.11
9,158,663 B2    10/2015  Vaidyan et al.
(Continued)

FOREIGN PATENT DOCUMENTS

WO    2014/166523    10/2014

OTHER PUBLICATIONS

Willocx, M., et al., Comparing performance parameters of mobile app development strategies, 2016 IEEE/ACM International Conference on Mobile Software Engineering and Systems, May 16-17, 2016, pp. 38-47, [retrieved on Feb. 21, 2019], Retrieved from the Internet: <URL:http://ieeexplore.ieee.org/>.*

(Continued)

*Primary Examiner* — Geoffrey R St Leger
(74) *Attorney, Agent, or Firm* — Mannava & Kang, P.C.

(57) ABSTRACT

A mobile application portfolio management system that estimates performance of a mobile application portfolio on various metrics and provides suggestions for improvements is disclosed. The mobile application portfolio manager calculates different KPIs for estimating performance of the mobile applications within the mobile application portfolio. The KPIs that underperform their respective thresholds are analyzed to isolate the elements of the KPIs that result in subpar performances by the KPIs. Various corrective actions to improve the performance of the elements of the KPIs can be derived based on the rules configured within the mobile application portfolio management system.

19 Claims, 14 Drawing Sheets

(51) Int. Cl.
*G06F 11/34* (2006.01)
*G06F 11/36* (2006.01)
*G06F 17/27* (2006.01)
*G06Q 30/02* (2012.01)
*G06F 3/0481* (2013.01)

(52) U.S. Cl.
CPC ...... *G06F 11/0793* (2013.01); *G06F 11/3452* (2013.01); *G06F 11/3466* (2013.01); *G06F 11/3616* (2013.01); *G06F 17/2785* (2013.01); *G06Q 30/0282* (2013.01)

(58) Field of Classification Search
CPC .... G06F 3/04817; G06F 3/0482; G06F 9/542; G06F 17/2785
USPC .......................................... 717/102, 130, 131
See application file for complete search history.

(56) References Cited

U.S. PATENT DOCUMENTS

| | | | | |
|---|---|---|---|---|
| 9,208,463 | B1* | 12/2015 | Bhide | G06F 16/903 |
| 9,223,831 | B2* | 12/2015 | Baker | G06Q 30/0631 |
| 9,280,777 | B2* | 3/2016 | Bilicki | G06Q 10/06 |
| 9,798,647 | B2* | 10/2017 | Lindo | G06F 11/3612 |
| 9,978,093 | B2* | 5/2018 | Pang | G06Q 30/0631 |
| 2006/0080014 | A1* | 4/2006 | Di Palma | G06F 11/3452 701/41 |
| 2006/0095309 | A1* | 5/2006 | Mangan | G06Q 10/00 717/123 |
| 2007/0043535 | A1 | 2/2007 | Belden | |
| 2007/0078702 | A1* | 4/2007 | Tandon | G06Q 10/06375 705/7.37 |
| 2011/0061013 | A1* | 3/2011 | Bilicki | G06Q 10/06 715/771 |
| 2012/0216108 | A1 | 8/2012 | Yambal et al. | |
| 2013/0080634 | A1* | 3/2013 | Grelewicz | H04W 24/06 709/224 |
| 2013/0268920 | A1* | 10/2013 | Ursal | G06F 8/70 717/131 |
| 2014/0188665 | A1* | 7/2014 | Baker | G06Q 30/0625 705/26.62 |
| 2014/0188897 | A1* | 7/2014 | Baker | G06Q 30/0631 707/748 |
| 2015/0007330 | A1* | 1/2015 | Gomez | G06F 21/577 726/25 |
| 2015/0019715 | A1* | 1/2015 | Ronen | H04W 24/08 709/224 |
| 2015/0067147 | A1 | 3/2015 | Carmel et al. | |
| 2015/0206156 | A1* | 7/2015 | Tryfon | G06O 30/0203 705/7.32 |
| 2015/0271026 | A1* | 9/2015 | Meduri | G06Q 30/0629 709/224 |
| 2015/0301698 | A1* | 10/2015 | Roques | G06F 3/0482 715/736 |
| 2015/0332373 | A1* | 11/2015 | Pang | G06Q 30/0631 705/26.7 |
| 2016/0103888 | A1* | 4/2016 | Fletcher | G06F 17/30477 707/722 |
| 2017/0046146 | A1* | 2/2017 | Jamjoom | G06F 8/62 |
| 2017/0200204 | A1* | 7/2017 | Bostick | G06Q 30/0282 |
| 2018/0124545 | A1* | 5/2018 | Mahata | H04W 4/50 |

OTHER PUBLICATIONS

Mazhelis, O., et al., A framework for evaluating Internet-of-Things platforms: Application provider viewpoint, 2014 IEEE World Forum on Internet of Things (WF-IoT), Mar. 6-8, 2014, pp. 147-152, [retrieved on Feb. 21, 2019], Retrieved from the Internet: <URL:http://ieeexplore.ieee.org/>.*

Verkasalo, H., Analysis of Smartphone User Behavior, 2010 Ninth International Conference on Mobile Business and 2010 Ninth Global Mobility Roundtable, Jun. 13-15, 2010, pp. 258-263, [retrieved on Feb. 21, 2019], Retrieved from the Internet: <URL:http://ieeexplore.ieee.org/>.*

* cited by examiner

TESTING AND IMPROVING PERFORMANCE OF MOBILE APPLICATION PORTFOLIOS

CROSS REFERENCE TO RELATED APPLICATIONS

The present application claims priority under 35 U.S.C. 119(a)-(d) to Indian provisional patent application number 201641040088, having a filing date of Nov. 23, 2016, the disclosure of which is hereby incorporated by reference in its entirety.

BACKGROUND

The use of mobile applications has exploded in the last few years and it is predicted that demand for mobile applications will grow five times faster than organizations' information technology (IT) groups can deliver them. Given the increase in demand, keeping up with mobile application maintenance and life cycle management has become extremely difficult. For example, keeping mobile applications current and relevant, making bug fixes, programming and deploying feature enhancements, and providing support for operating system (OS) updates should be done to ensure that a mobile application remains operational and current. Furthermore, the difficulty in keeping up with mobile application maintenance and life cycle management is further exacerbated when multiple mobile applications are being supported. As an example, a company may deploy mobile applications, which may include different mobile applications and/or different versions of the same mobile application, which may vary by geographic region. The mobile applications may be supported by different entities in different regions. As a result, the mobile applications may become outdated and less useful and non-functional if bug fixes and OS updates are not provided regularly.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
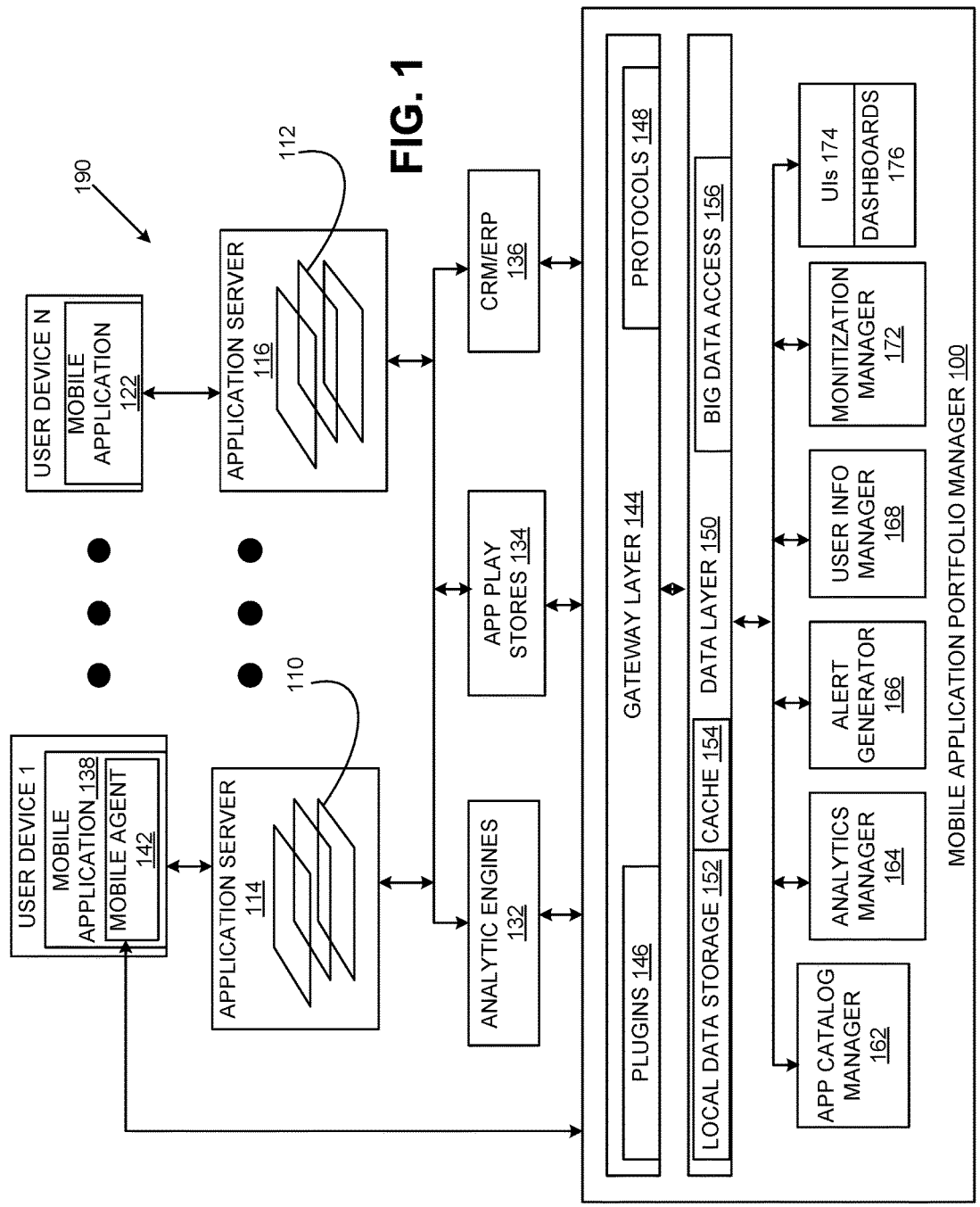
FIG. 1 illustrates a high-level architecture of a communication network that includes a mobile application portfolio management system according to an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, mobile application portfolio management system that monitors data related to the performance of a mobile application portfolio and automatically provides suggestions for improvements in the performance is disclosed. A mobile application portfolio can include a plurality of mobile applications (mobile apps) grouped according to different criteria. The mobile applications that are managed by the same entity may be grouped in a mobile application portfolio wherein the entity may also manage a plurality of such mobile application portfolios. Similarly, mobile application portfolios may be obtained by grouping the mobile applications that satisfy various criterial such as having a common domain or category, mobile applications serving within a geographic area, mobile applications catering to a particular demographic or mobile applications satisfying particular performance criteria and the like. The plurality of mobile applications within a mobile application portfolio may also include without limitation, different versions of the mobile applications that were released at different times, different versions released for different platforms including operating systems and/or devices and the like. The mobile application portfolio management system may provide the suggestions for improving performance either via alerts or by displaying the suggestions on various dashboards configured therein.

The mobile application portfolio management system may be communicatively coupled to a plurality of data sources from which the application data and the performance data of the mobile applications is received. The plurality of data sources can include third party analytics tools that may be monitoring the performances of one or more of the mobile applications individually, app play stores, application servers and related systems such as the customer relationship management/enterprise resource planning (CRM/ERP) tools that serve the mobile applications and mobile agents. The mobile agents can be libraries of functions that are compiled with the individual mobile applications and are executed on the user devices that run the mobile applications. In addition, the mobile application portfolio management system may also interact with big data sources such as Hadoop™ to collect the requisite data. The data collected from the various data sources can include both application data and performance data. The application data can include data not directly related to the functioning of the mobile application such as number of users of the mobile application, revenue generated by the mobile application, number of downloads within a given time period, the ratings and reviews and the like. The performance data can be data that is directly related to the functioning of the application such as the mobile application download speed, speed with which the UIs of the mobile application load from a device memory, security of the mobile application, the user experience score, the quality of the mobile application code, crash data and the like.

The mobile application portfolio management system includes a gateway layer that includes the plugins 146 and protocols 148 that may be required to interface with the plurality of data sources. A data layer includes local data stores and cache that may be employed by the mobile application portfolio management system for executing the various tasks related to mobile application portfolio management. In addition, the data layer may also provide access to the big data sources. The mobile application portfolio management system estimates various Key Performance Indicators (KPIs) from the data collected from the plurality of data sources. KPIs are indicative of the effective performance of the mobile application in executing various functions that the mobile application is configured for and achieving specific predetermined targets. The KPIs may be estimated at various levels including but not limited to portfolio-level KPIs, individual app level KPIs, app category level KPIs and the like. For example, in terms of functionality of the mobile applications, the KPIs can indicate application code quality, application security vulnerability, application performance index and applications user experience score.

An analytics manager accesses the KPI values and summarizes the KPIs to detect trends by employing statistical techniques. If the trends indicate that the mobile application may not achieve certain goals or thresholds or multiple failures on one or more metrics, steps to correct the trends can be automatically suggested as detailed herein. Another factor that is taken into consideration to determine performance efficiency of the mobile application portfolio is user sentiment. A sentiment analyzer accesses the various user reviews and ratings to determine the user sentiment regarding one or more mobile applications within a mobile application portfolio. The user sentiment for the mobile application portfolio can be determined as an average of the user sentiments associated with individual applications within the mobile application portfolio. The average user sentiment may be determined via applying natural language processing techniques and sentiment analysis to the user reviews and ratings for individual mobile applications and aggregating the results from the various mobile applications within the mobile application portfolio.

The mobile application portfolio management system may be configured with formulae to calculate various KPIs at different levels based on various attributes. The KPIs thus calculated are compared with respective KPI thresholds to determine the performance of the individual mobile applications or the mobile application portfolio. A respective KPI threshold for a given KPI depends on the level at which the KPI is calculated based on certain rules. The rules for a given KPI may set its respective threshold so that the KPI exceeding its threshold indicates a need for corrective action(s). Similarly, the rules may set another threshold for another KPI for that mobile application so that the other KPI falling below the KPI threshold indicates the need for corrective actions.

The mobile application portfolio management system is configured to automatically provide corrective actions for KPIs that show trends that the KPIs may not meet their respective thresholds or the KPIs that are determined to show sub-par performance with respect to their thresholds. The KPIs are analyzed to identify the individual elements that contribute to their values. The values of the individual elements are obtained from the application data and the performance data and compared with respective element thresholds. One or more of the individual elements that are contributing to the underperforming KPI are identified. A table with the various probable scenarios for individual elements underperforming their respective element thresholds of a given KPI mapped to respective corrective actions is accessed. Based on a comparison of the currently-underperforming elements of the KPI with the scenarios in the table, the corrective actions may be identified from the table. An alert including one or more of the KPI values, individual element values and corrective actions can be transmitted to a user via one or more communication modes such as but not limited to Small Message Service (SMS), email, Instant Message (IM) and the like. Alternatively, one or more dashboards can be updated to display the alert and the corrective action.

The mobile application portfolio management system disclosed herein enables estimating and improving performances of mobile application portfolios that include a plurality of mobile applications. Existing analytical tools may analyze data of individual applications but are not configured to analyze performance of groups of mobile applications or mobile application portfolios wherein each mobile application contributes partly to the performance of a mobile application portfolio as a whole. The existing analytical tools also fail to provide user interfaces such as the dashboards described herein that allow users administering the mobile application platform to make comparisons between the various mobile applications and gain insights. Accordingly, metrics and KPIs are defined and analytics are executed with respect to the mobile application portfolio as a whole as compared to individual mobile application performances. The mobile application portfolio management system automatically pulls out the application development metrics thereby enabling improvements in the mobile application quality. The predictive maintenance features such as trend identification and alert generation enable rationalizing a mobile application portfolio. Accordingly, if an underperforming mobile application is identified from the portfolio of mobile applications, one solution that the mobile application portfolio management system may suggest is to decommission the underperforming mobile application. Even within different mobile applications, the mobile application portfolio management system provides a platform for comparing the efficiency and performance of various mobile applications so that poorly-performing releases, versions and the like can be improved or discontinued.

FIG. 1 illustrates a high-level architecture of a communication network 190 that includes a mobile application portfolio management system 100, according to an example. The mobile application portfolio management system 100 provides customized monitoring, mobile application diagnostics, mobile application maintenance, and life cycle management for a portfolio of mobile applications. One or more portfolios of mobile applications 110, 112 (i.e., collections of mobile apps 110, 112) may include different mobile apps and/or different versions of the same mobile app, which may vary by geographic region. The portfolios 110, 112 may be hosted on one or more application servers such as application server 114, application server 116. Each of the portfolios 110 and 112 maybe supported by same entity or by different entities in different regions. Various mobile devices such as user device 1, . . . user device N including but not limited to smartphones, tablets, laptops, virtual reality or mixed reality devices and the like may access one or more of the different mobile applications from the application server 114 or the application server 116 using public or private communication networks such as the internet or a private intranet.

A mobile application, which may be referred to as an app or a mobile app, is a type of application software designed to run on a mobile device, such as the user device 1, . . . user device N. For example, a mobile app may be a native app that is designed and coded for a specific kind of device and OS, such as iOS™ or Android™. For instance, iPhone™ apps are commonly coded in Objective-C, and Android™ apps are commonly coded in Java™. In many instances, the mobile app can be downloaded from an app store, and installed on a mobile device, where it can be launched by tapping on its icon. Another type of a mobile app is a web app, which loads within a mobile browser. The web app runs in the mobile browser, so it may not need to be installed on the mobile devices and thus saves storage space. Another type of mobile app is a hybrid app which are web applications that run in native browsers such as UIWebView in iOS™ and WebView in Android™ (not Safari or Chrome). The bulk of web app may be built using a cross-compatible web technology, such as HTML5™, CSS™ or Javascript™, however, some native code particular to the OS may be used to allow the app to access wider functionality of the device and produce a more refined user experience. In some examples, one or more of the apps in the portfolios 110 and/or 112 may be also used to interact with IOT devices. In addition, the mobile application portfolios 110, 112 may also include one or more of augmented reality (AR), virtual reality (VR) applications. The mobile application 138 and 122 may therefore be installed for execution or may be executed via browsers on the user device 1, user device N and the like.

The application servers 114, 116 may be connected to backend infrastructure including tools such as but not limited to analytic tools or engines 132, app play stores 134 and CRM/ERP tools 136. In an example, the various tools may be executed by the application servers 114, 116 or other servers administered by the entities supporting the respective mobile application portfolios. The backend infrastructure enables control and administration of the mobile application portfolios 110, 112. The mobile application portfolios 110, 112 are both shown as being supported by the same backend infrastructure herein for brevity but it can be appreciated that the mobile application portfolios 110 and 112 can be connected to different backend infrastructure in an example. The backend infrastructure includes at least the analytic engines 132, app play stores 134 and CRM/ERP tools 136 employed by the entities managing the application servers 114 and 116.

The mobile application portfolio management system 100 can access performance data for the mobile application portfolios 110, 112 from various data sources which may include not only the tools supporting the mobile application portfolios on the backend but also the user devices 1, . . . N that run the mobile apps from the mobile application portfolios 110, 112. The tools such as the analytics engines 132, app play stores 134 and the CRM/ERP tools 136 serve as some of the data sources that provide performance data that the mobile application portfolio management system 100 can employ to manage the performance of the mobile application portfolios 110, 112. In an example, the analytic engines 132 may include third-party tools for collecting and analyzing app analytics such as Google Analytics™ for mobile apps that provides analytics data regarding one or more mobile applications. Data such as but not limited to user downloads, ratings, reviews or other user experience information may be obtained from the app play stores 134. The Customer Relationship Management (CRM) 136 tools may be configured to provide customer-related data including customer interactions, revenue data, sales data or other business related information. The ERP tools 136 may provide information originating on the backend infrastructure during the operation of the mobile apps in the mobile application portfolios 110 and 112. In addition, raw data regarding user behavior and other mobile application performance information can be obtained from a mobile agent 142 included with the mobile application 138. The mobile agent 142 can be a library of functions compiled with the mobile application 138 that enable the mobile application 138 to transmit the required data to a designated data collector such as the analytic engines and the like.

The gateway layer 144 is included in the mobile application portfolio management system 100 supports various mechanisms that enable collecting data from the various data sources. The gateway layer 144 may support third-party protocol plugins for connecting with the third-party platforms and for exchanging data. By the way of illustration and not limitation, the gateway layer 144 may support representational state transfer (REST) application programming interface (API), Message Queue Telemetry Transport (MQTT), Constrained Application Protocol (CoAP), Secure File Transfer Protocol (SFTP), Hyper Text Transfer Protocol (HTTP) and the like. In an example, the gateway layer 144 may be configured in terms of services used or customized for integration with the third-party platforms.

The data collected by the gateway layer 144 from the various data sources can be stored to the data layer 150 of the mobile application portfolio management system 100. The data layer 150 includes internal data storage elements of the mobile application portfolio management system 100 such as local data storage 152, cache 154 or such as but not limited to relational database systems, NoSQL or non-relational databases and the like. The data layer 150 may also enable access by the mobile application portfolio management system 100 to Big Data storage systems such as Hadoop file systems (HDFS) and the like. Access to Big Data storage systems enables the mobile application portfolio management system 100 to analyze large amounts of data to determine trends in the various KPIs and suggest corrective actions for those KPIs that may be lagging in performance when compared to respective thresholds.

Data regarding various metrics that measure performance and other aspects for the mobile application portfolios 110, 112 may be collected and stored in the data layer 150 to determine the KPIs. The mobile application portfolio management system 100 monitors the mobile applications and collects information at various levels of granularity. A user who employs the mobile application portfolio management system 100 to monitor the performance of the mobile application portfolios 110 or 112 or one or more mobile applications therein, therefore, has access to data views that provide enterprise-wide metrics or even segment-wise metrics across enterprises such that the views can be further drilled down to obtain metrics for individual mobile applications or individual attributes across applications as will be detailed further infra. The granularity within the performance data enables generating summarized views for performance data for a plurality of KPIs based on unique attribute combinations. For example, the attribute combinations may include at least an organization id (ORG ID) identifying an enterprise that maintains one or more mobile applications for obtaining enterprise-wide KPIs while a combination of the ORG ID and an application id (APP ID) identifies an individual application of an enterprise for obtaining application level KPIs.

An app catalog manager 162 included in the mobile application portfolio management system 100 gathers application data stored in the data layer 150 for the mobile applications within the mobile application portfolios 110, 112, which may include output of analytics from third-party analytical tools. The app catalog manager 162 can generate a matrix of application data including metrics for each of the mobile applications within the mobile application portfolios 110, 112. The mobile application portfolio management system 100 includes an analytics manager 164 that interacts with the big data stores via the big data access 156 provision in the data layer 150 to provide millions of data insights generated by the analytics operation on the performance and/or application data from the big data sources. The analytics manager 164 may further access the matrix of application data to identify current trends in mobile application performances across the mobile application portfolios 110 and 112. In an example, the analytics manager 164 may employ natural language processing (NLP) techniques and sentiment analysis to obtain sentiments and other information from the application data.

An alert generator 166 is configured to generate alerts when performance or application data indicates one or more KPIs that are below respective thresholds and necessitate actions for improvement. The thresholds may be based on business rules that specify mappings of metrics from the application data to KPIs. The business rules may specify functions for calculating one or more of the KPIs from the metrics and conditions for generating the alerts. In addition, corrective actions may be suggested to improve the KPIs that are below respective thresholds. The user info manager 168 enables storing data related to transactions between various users of the mobile application portfolio management system 100 and the mobile application portfolios. The monetization manager 172 enables fee calculation for use of the mobile application portfolio management system 100 by users. For example, fees for a pay-as-you-go plan may be determined, or fees for a gold, silver or bronze usage plan may be determined. The monetization manager 172 may calculate fees based on use of the mobile application portfolio management system 100 to provide to billing systems. The user interfaces (UIs) 174 include screens to configure the mobile application portfolio management system 100 or sign up for services of the mobile application portfolio management system 100 or other administrative tasks. The UIs 174 further provide alerts regarding poorly performing KPIs which may also include suggestions for improving the corresponding metrics. The trends information and other insights from the analytics manager 164 as further detailed herein can be displayed to the users via the dashboards 176.

Figure 2:
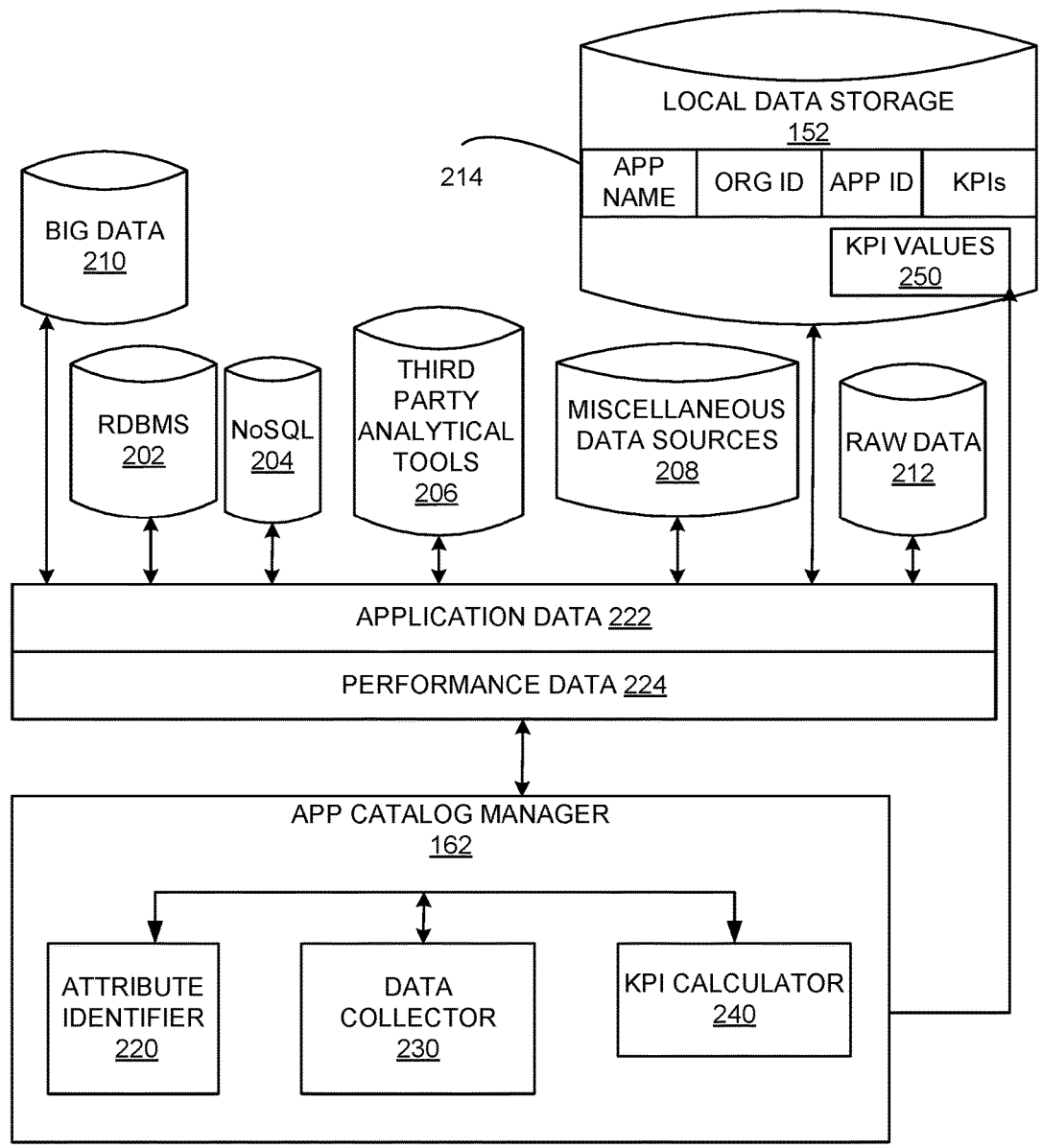
FIG. 2 shows the details of an app catalog manager in accordance with an example.

FIG. 2 shows the details of the app catalog manager 162 in accordance with an example. As discussed above, the mobile application portfolio management system 100 accesses a plurality of data sources including structure and unstructured data of various types such as Relational Database Management Systems (RDBMS) 202, NoSQL (Structured Query Language) 204, other third-party analytical tools 206, other miscellaneous data sources 208 such as but not limited to spreadsheets, comma separated value (CSV) files, flat files and the like and big data 210 such as but not limited to HDFS in addition to raw data from the mobile agent 142 running on the user devices which may include IoT devices. In an example, the app catalog manager 162 may pull data automatically from the aforementioned data sources at routine intervals or upon receiving a user request for information, updated dashboards or reports. In an example, the data from the various data sources 202-210 may be pushed to the app catalog manager 162 to produce reports or update dashboards.

When data is received, an attribute identifier 220 included in the app catalog manager 162 may identify values of attributes associated the received data. When a new organization or entity registers for the services of the mobile application portfolio management system 100, an ORG ID is assigned to identify the organization or entity. In addition, each of the mobile applications associated with the organization may be assigned an identifier such as an APP ID by the mobile application portfolio management system 100. In an example, the APP ID of a mobile application may be unique across the mobile application portfolios 110, 112 being managed by the mobile application portfolio management system 100. In an example, a combination of the APP ID and the ORG ID may uniquely identify a mobile application within the mobile application portfolio management system 100. The local data storage 152 of the mobile application portfolio management system 100 may store a table 214 that includes a mapping of the plurality of mobile applications within the mobile application portfolios 110, 112 to respective ORG IDs, APP IDs and the KPIs that need to be calculated for the corresponding APP ID. In an example, the APP ID may be configured to convey other attribute information of a mobile application such as but not limited to the version of the mobile app, the operating system that the mobile app is configured for, geographic area associated with the mobile app if applicable, language of the mobile app, the category of the mobile app such as fitness app, retail app, banking app, gaming app and the like.

The app catalog manager 162 also includes a data collector 230 which interfaces with the various data sources 202, 204, 206, 208, 210 and 212 using the various mechanisms of the gateway layer 144. The data collector 230 can be configured to collect application data 222 such as but not limited to data regarding delivery model such as SaaS, private cloud, data regarding mobile platforms including iOS, Android, Windows phone, engagement data such as active users, unique visitors, user demographics, retention, downloads, average session time, financial data such as total transaction revenue, average revenue per user, average transaction value, lifetime value, other data such as session recordings/replay, heat map, the number of devices the application is currently operating on and the device attributes, the user reviews and ratings for the application, revenues from the application, the level of user engagement achieved by the application and the like. The data collector 230 also receives performance data 224 of the mobile application such as but not limited to crash data, CPU/Memory/Battery/Network usage, application security, user session attributes, and the like.

A KPI calculator 240 calculates various KPI values 250 from the performance data obtained from the various data sources 202-212. As mentioned herein, KPIs across an organization or enterprise-wide KPIs obtained for the mobile applications sharing the same ORG ID, portfolio-wide KPIs, KPIs for particular domains and application-level KPIs may be calculated by the KPI calculator 240. The KPI calculator 240 can also obtain performance comparisons across the portfolios or across domains. The KPI values 250 thus obtained may be stored to the local data storage 152 for use by other elements of the mobile application portfolio management system 100 in downstream processes for generating alerts or updating dashboards. Based on an analysis of the KPI behavior various adjustments and tweaks as outlined herein can be made to the mobile applications within the mobile application portfolios 110, 112 thereby improving their performances. In some examples the table 214 and the KPI values 250 may be stored in external databases that may be remote from the mobile application portfolio management system 100.

Figure 3:
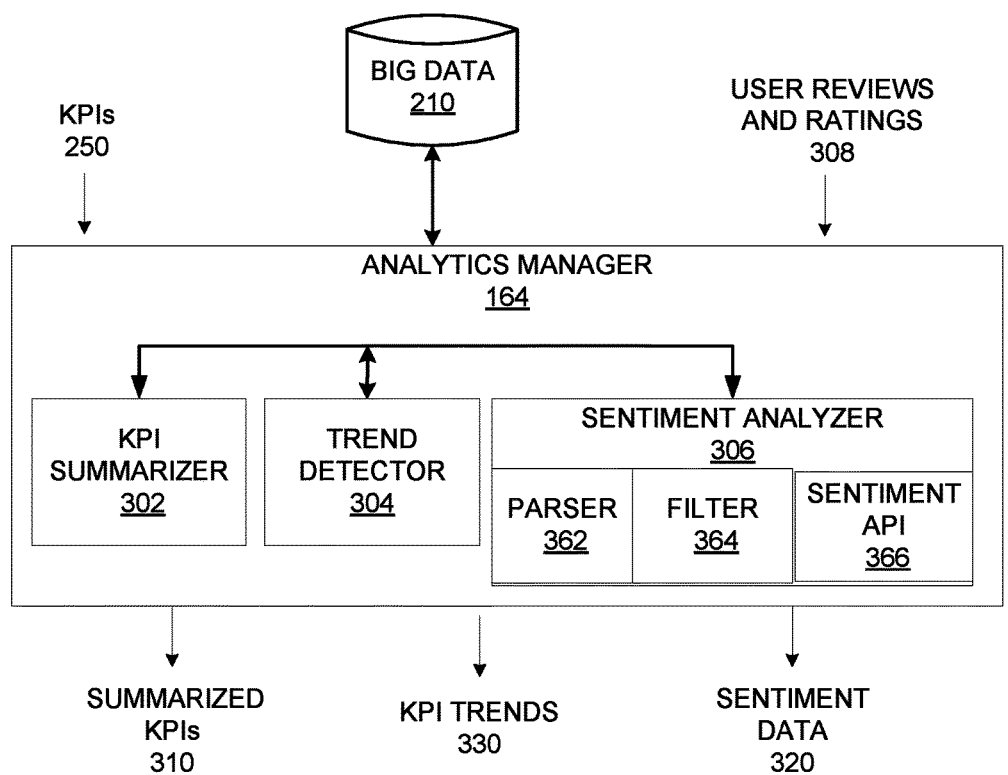
FIG. 3 shows a block diagram of an analytics manager in accordance with an example.

FIG. 3 shows a block diagram of the analytics manager 164 in accordance with an example. The analytics manager 164 includes a KPI summarizer 302, a trend detector 304 and a sentiment analyzer 306. The KPI summarizer 302 accesses the KPI values 250 generated by the app catalog manager 162 to summarize or obtain averages of the KPIs. The KPI values 250 may be summarized for various attributes such as APP IDs, ORG IDs, mobile application categories, user populations grouped by various demographic factors, Operating Systems (OS), specific technologies used in the mobile application and the like. For example, summarized KPI values may indicate frequent crashes of a tablet version of an application as compared to a smartphone version of the application. The summarized KPI data may allow a user studying the problems with the tablet version to further drill down and investigate what other tablet applications are crashing, if the tablet application crashes are coming from a particular region, a particular OS or a particular language, particular tools and technologies that were used in developing the mobile applications and similar other attributes. Similar analysis can be extended to one or more of the mobile application portfolios 110, 112 to investigate stability of the tablet versions of the mobile applications. The user's investigation is aided by the various dashboards 176 that display the summarized KPIs 310.

The summarized KPIs 310 may be used by the trend detector 304 to determine trends in the KPIs. In an example, the trend detector 304 may mine data from big data 210 sources which store large volume of application data 222 and performance data 224 in order to identify data trends. The trend detector 304 may use various statistical techniques such as but not limited to regression analysis or other non-parametric methods over time series data from the big data sources in order to predict KPI trends 330. As with other analytical data, the KPI trends may be obtained for various attributes such as APP ID, ORG ID, for mobile applications based on categories, OS, geographical locations, language, specific devices and the like. The KPI trends 330 may be conveyed to a user via one or more of alerts or dashboards as detailed herein so that actions to change the trends can be executed in advance prior to any failures within the mobile application(s) or the mobile application portfolio being managed by the mobile application portfolio management system 100.

A sentiment analyzer 306 is included with the analytics manager 164 to collect the sentiments associated with user reviews/comments and ratings 308 from the app play stores 134 and one or more of the various data sources 202-212. An average of the user ratings based on various scales, rating systems and the like can be a good indicator of the user sentiment towards a particular mobile application. However, further analysis of user comments and reviews may provide clues regarding the errors or faults of the mobile application that is causing negative reaction from the users. Accordingly, the sentiment analyzer 306 includes a parser 362, a filter 364 and sentiment API 366. The user reviews and comments are parsed and filtered prior to being analyzed using the sentiment API 366 including tools such as Google Cloud Natural Language API in order to detect positive or negative trends in user sentiments in real-time. In an example, the sentiment analyzer 306 may include artificial intelligent (AI) elements that are trained to look for particular words within the user reviews that convey information regarding the user sentiments and/or problems with the mobile application. Such information may displayed on the dashboards 176 or conveyed via any alerts that may be generated.

Figure 4:
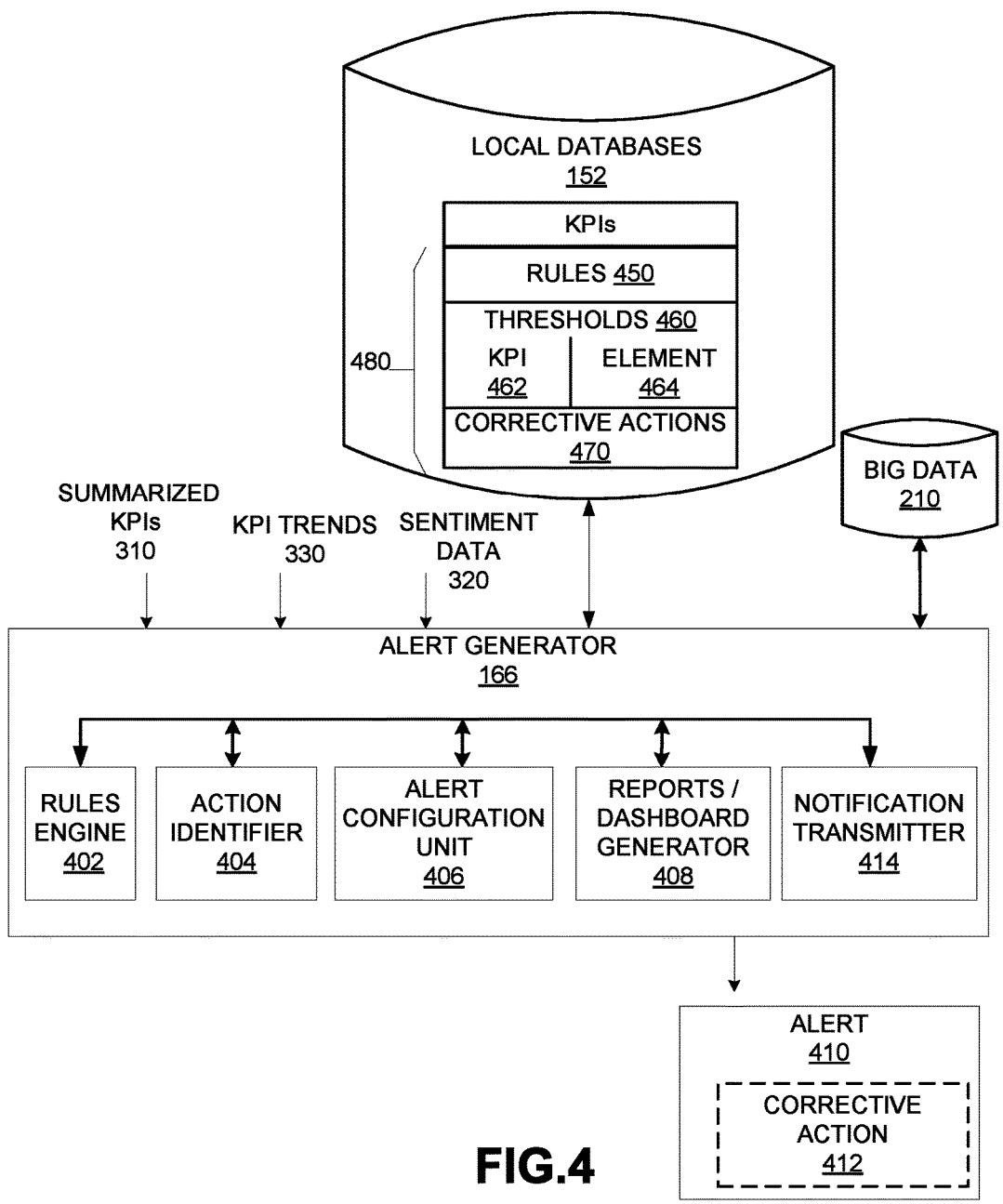
FIG. 4 shows a block diagram of an alert generator in accordance with an example.

FIG. 4 shows a block diagram of the alert generator 166 in accordance with an example. The alert generator 166 is configured with a rules engine 402 that analyzes the KPI values 250, the summarized KPIs 310, the KPI trends 330 to identify KPIs that indicate subpar performance by the mobile application, organization or a category on one or more metrics. The subpar performance can be identified by comparing one or more of the KPI values 250, summarized KPIs 310 or KPI trends 330 with respective KPI thresholds 462. The respective KPI thresholds 462 can be determined for each of a plurality of KPIs, summarized KPIs or KPI trends 330 based on rules 450. For each mobile application associated with a unique APP ID within the portfolio manager, a table 480 including the KPIs, rules 450, thresholds 460 which include a plurality of KPI thresholds 462 and a plurality of element thresholds 464 and the corrective actions 470 can be stored in the local data storage 152 wherein each of the corrective actions 470 may be mapped to specific rules associated with a given KPI.

The rules 450 may include rules for generating visualizations of application data 222 or performance data 224 for the mobile application portfolios 110, 112. The rules 450 may specify mappings of metrics from the application data 222 and the performance data to KPI values 250 displayed in one or more of the dashboards 176, and may specify functions for calculating one or more of the KPIs from the metrics. The rules 450 may also specify conditions for generating alerts. For example, a KPI associated with the number of active users or revenue associated with active users may have respective thresholds based on the minimum number of active users or minimum revenues that are needed to make it feasible to provide the mobile app. In another example, for a video mobile app, the bandwidth KPI may have a respective threshold set to a minimum bandwidth requirement below which the video mobile app may not function properly. When a KPI is determined to be below a respective KPI threshold, the alert configuration unit 406 may send out an alert with the information regarding the KPI. The alert may be sent out as a push message either as an email, an SMS, via a messaging application and the like.

In an example, the mobile application portfolio management system 100 may be configured with access to certain predetermined corrective actions 470 stored on one or more of the local data storage 152 or external databases. When the rules engine 402 determines that a KPI is below a respective threshold, the action identifier 404 may attempt to identify one or more predetermined corrective actions 470 that were configured with the mobile application portfolio management system 100. For example, for a given KPI and corresponding sentiment data 320 a predetermined corrective action may be configured for suggestion within the mobile application portfolio management system 100 when negative sentiment over a respective threshold is detected. A suggestion for a corrective action 412 thus identified from the corrective actions 470 can be included in the alert 410 that is sent out. In another example, if the identified condition is below a severity threshold level, the corrective action 412 may be displayed within one or more of the dashboards 176 as opposed to being transmitted in an alert 410. The alert generator 166 may also include a reports and dashboard generator 408 which can receive user input regarding the reports that a user of the mobile application portfolio management system 100 may desire either regularly or on ad-hoc basis. The reports and dashboard generator 408 also receives input regarding the dashboards that the user may desire to view. In an example, the dashboards 176 thus created can include interactive user elements that allow a user to drill down further on particular elements of a KPI or metrics or may even include suggestions for corrective actions to improve KPIs that have sub-par performances. A notification transmitter 414 and may be part of the alert and reporting framework which enables transmitting reports, alerts or notifications regarding updates to the dashboards 176 and the like.

Figure 5:
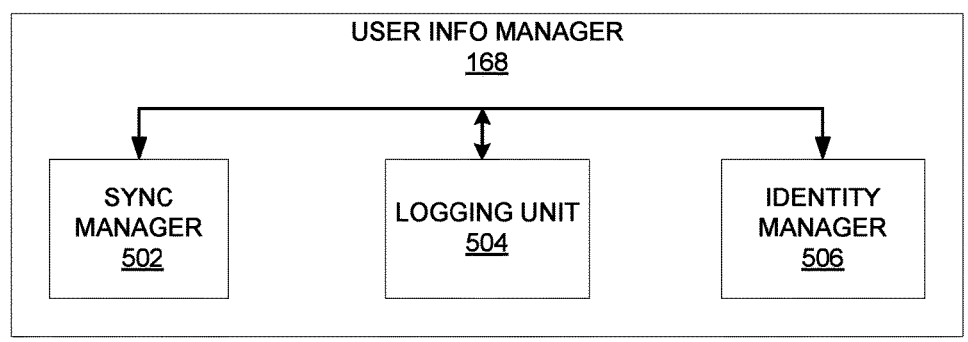
FIG. 5 shows a block diagram of a user info manager in accordance with an example.

FIG. 5 shows a block diagram of the user info manager 168 in accordance with an example. The user info manager 168 includes a synch manager 502 that may synchronize requests from a plurality of users, which may be received via an application program interface (API). The logging unit 504 is the platform logging, and may store data related to transactions between users and the mobile application portfolio management system 100. An identity manager 506 is also included within the user info manager 168 for managing user identities and providing an abstraction layer that allows integration of multiple user storage types (e.g., Lightweight Directory Access Protocol (LDAP), active directory, Java Database Connectivity (JDBC), etc.) for the storage of user details. The identity manager 506 may also control user access based on authenticating logins.

Figure 6:
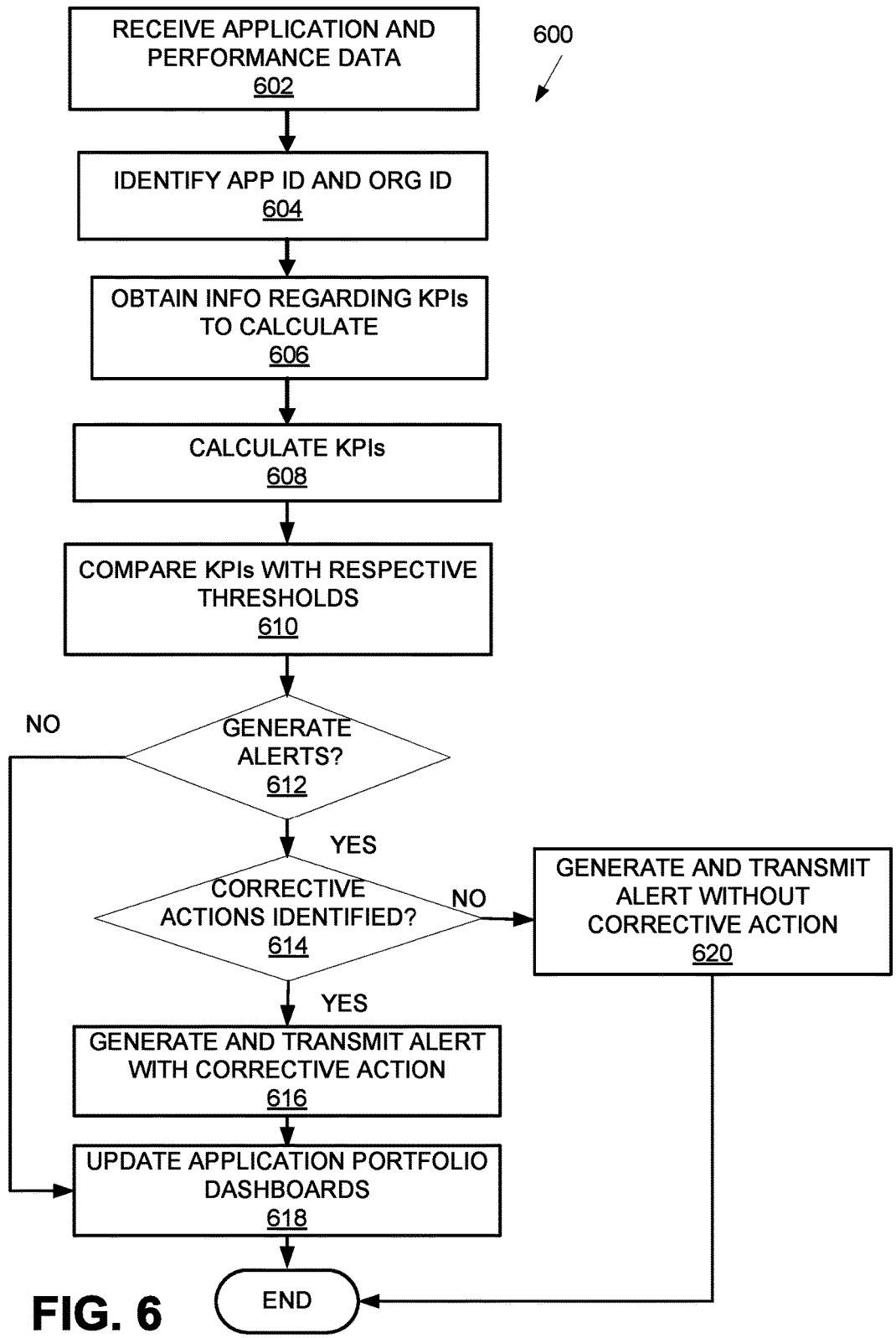
FIG. 6 is a flowchart that details a method of generating a portfolio view of KPIs in accordance with an example.

FIG. 6 is a flowchart 600 that details a method of generating portfolio view of KPIs in accordance with an example. The method starts at 602 wherein one or more of application and performance data of at least one mobile application in the mobile application portfolios 110, 112 is received by the portfolio manager. Various attributes such as APP ID and ORG ID of the received application data and performance data may be identified at 604. The information regarding the KPIs to be calculated is obtained at 606, for example, from the table 214. The various KPIs are calculated at 608 based on the information obtained at 606 and at the levels specified by the attributes identified at 604.

As discussed above, KPIs can be calculated at different granularities so that KPIs are defined at organizational level, mobile application portfolio level and individual application level. Other customized levels for KPI calculations may also be defined per requirements, such as for example, region level, department level, development tool level and the like. For a given mobile application, receipt of one or more of new application or performance data may trigger an update of the various KPIs that are affected by the new data. The calculation of some KPIs are discussed below by the way of illustration but not limitation. A mobile application may not only operate on backend infrastructure but also puts forth front end elements such as alerts, dashboards and the like for user interaction so that issues or problems may not only arise in the backend but may also arise in the front end elements. Accordingly, an attribute called 'percent reduction in issue count'=x may be defined for the mobile application. A few KPIs based on 'x' from the hundreds of KPIs that may be calculated are shown below. It may be understood that the KPIs discussed below may be applicable at organizational level, portfolio level or application level based on the level at which x is defined. Accordingly, various tables with organizational level, portfolio level or application level data may be accessed to obtain the below KPIs at the corresponding level.

$$\text{Frontend issues reduced} = \frac{(x * \text{front end issue count})}{100} \quad \text{Eq. (1)}$$

$$\text{Backend issues reduced} = \frac{(x * \text{backend issue count})}{100} \quad \text{Eq. (2)}$$

$$\text{Abandoned reduced} = \frac{(x * \text{abandonded count})}{100} \quad \text{Eq. (3)}$$

$$\text{Average revenue per issue} = \frac{\text{Revenue}}{\text{Total count of successful transactions}} \quad \text{Eq. (4)}$$

The various KPIs that are obtained at 608 are compared with respective thresholds at 610. The respective thresholds are obtained based on one or more of the level at which the KPI is defined, business requirements and technical parameters. For example, the threshold for frontend issues or backend issues may depend on capabilities of the machines running the mobile application portfolio management system 100, while the average revenue per issue is obtained based not only on the technical parameters but also business requirements. Moreover, the thresholds may be defined so that when the KPIs fall below or exceed over the thresholds, alerts are generated. For example in the quantities listed above, a threshold for revenue per issue falls below a threshold an alert is issued whereas for backend issues or front end issues a KPI value going over a threshold value may trigger an alert.

At 612, it is determined if one or more alerts are to be generated based on a determination regarding whether one or more KPIs are falling below or going over their respective thresholds. If it is determined that the KPIs don't underperform their respective thresholds then no alerts need to be generated and the method proceeds to 618 to updated the application dashboards where necessary with the current values from the application data 222 and the performance data 224 and terminate on the end block. If it is determined at 612 that one or more of the KPI values are underperforming their respective thresholds, it is further determined at 614 if one or more of the corrective actions 470 can be identified to remedy the situations that caused the KPIs to underperform their respective thresholds. In an example, a corrective action can be a simple communication to corresponding personnel with an update regarding the subpar performance of the KPI. In other examples, a more detailed analysis of the data that caused the KPI to underperform may be conducted and the information gathered can be included in the communication to the personnel. The corrective actions 470 may also include aids such as checklists to identify problems and notes regarding the various solutions may also be included in the alert that is generated and transmitted at 616. Additionally, the corresponding dashboards are updated at 618 with the current values from the application data 222 and the performance data 224 received at 602 in addition to the new KPI values and corrective actions if any were identified. If no corrective actions could be determined at 614, an alert is generated and transmitted without the corrective action at 620 and the method terminates on the end block.

Figure 7:
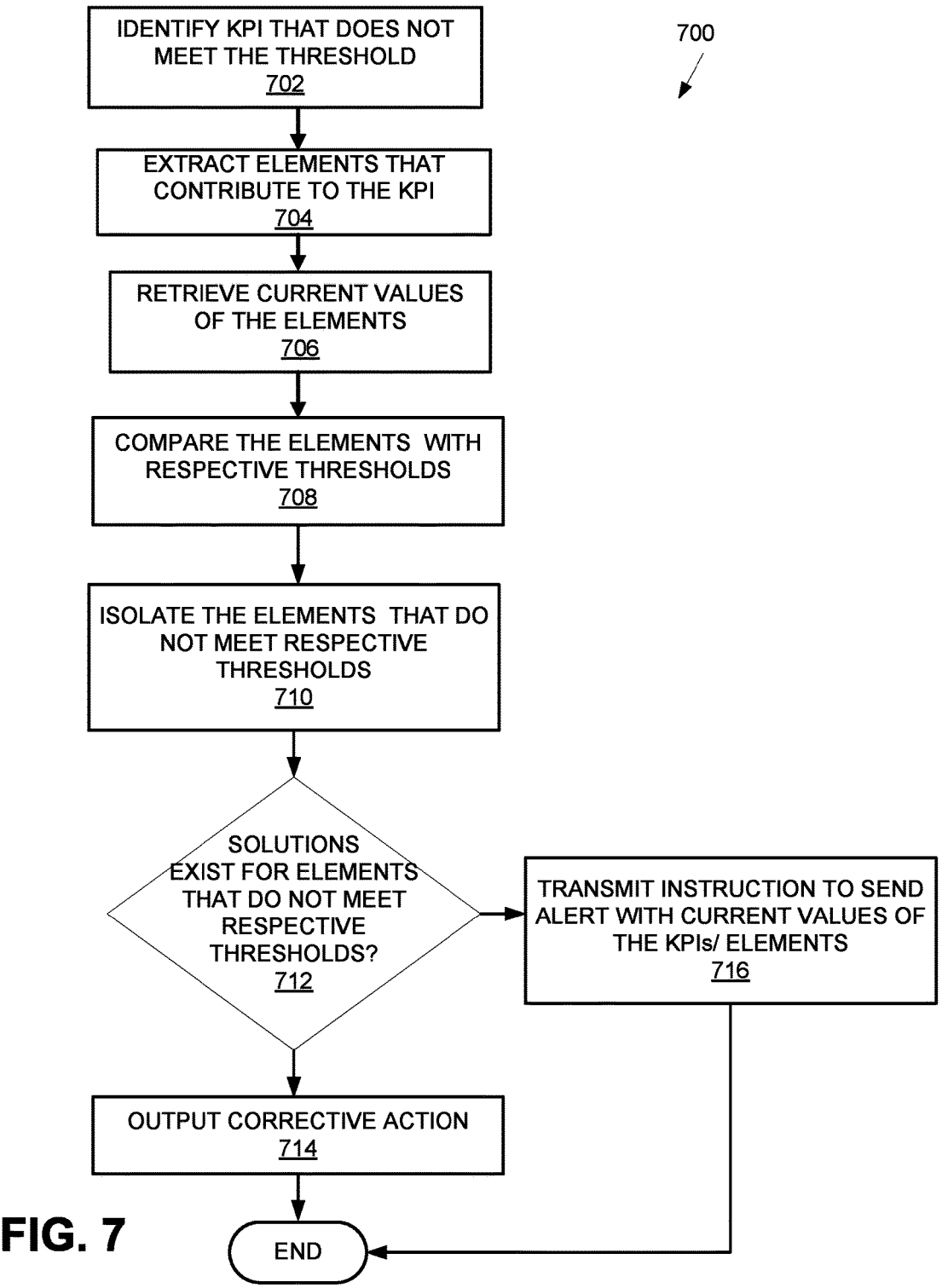
FIG. 7 is a flowchart that details a method of suggesting a corrective action in accordance with examples described herein.

FIG. 7 is a flowchart 700 that details a method of suggesting a corrective action in accordance with examples described herein. A KPI with subpar performance that does not meet the respective threshold is identified at 702. At 704, the elements that contribute to the KPI are extracted and the current values of the elements are retrieved from one or more of the application data 222 or the performance data 224 at 706. The current values of the elements are compared with respective thresholds at 708. The respective threshold values for the elements of the KPIs may be determined from the rules 450 in the table 480. At 710, one or more of the elements of the KPI that do not meet their respective thresholds are isolated. At 712, it is further determined from the rules 450 and the corrective actions 470 if any suggestions for solutions exist for the elements of the KPI failing to meet their respective element thresholds 464. The solutions can include not only actionable items with specific suggestions to the changes in parts of the mobile application portfolio management system 100 such as suggesting use of alternate resources such as networks, tools and the like, or suggestions to changes in business logic of one or more parts of the mobile application portfolio management system 100 or even a checklist with attributes that a user can check from the various parts of the mobile application portfolio management system 100 in order to isolate the problem of subpar performance by the KPI. Checklists can be useful where performance of elements of one KPI may depend on elements of another KPI so that the user is advised to check values of the elements of the other KPI.

If it is determined at 712 that a solution or corrective actions exist, then the corrective action is output at 714 for inclusion in the alert 410 as described above. If on the other hand, it is determined that no corrective action is provided in the table 480, an instruction to send the alert with the current value of the KPI and elements may be transmitted at 716 and the procedure terminates on the end block. It can be appreciated that the mobile application portfolio management system 100 is configured to improve performance of the mobile application portfolios 110, 112 as a whole. Therefore, the corrective actions determined at 712 may lead to improved performance of a particular element of the KPI and hence the KPI in some examples. In other examples, if no corrective action to improve the performance of the element(s) of the KPI can be determined at 712, the corrective actions may suggest that the mobile application be decommissioned so that performance of the mobile application portfolio under test can be improved as a whole.

An example is discussed below to illustrate the procedure outlined in FIG. 7. Eq. (4) above describes 'revenue per issue' KPI which can be interpreted as revenue lost per each issue arising in a mobile application portfolio. A threshold can be set for the KPI wherein if the KPI exceeds the threshold or if more revenue is lost per issue than optimal, the problem can be flagged for identifying a solution. When Eq. (4) is analyzed, it can be understood that a high value of the "revenue per issue" can be due to one or more of a high value of 'Revenue' in the numerator and low value of 'no. of successful transactions' in the denominator. By comparing the elements of the KPI, namely 'Revenue' and 'no. of successful transactions' with respective thresholds, the problematic element can be isolated. Accordingly, the table 480 may include suggestions for corrective actions to reduce the revenue lost per issue and/or to increase the number of successful transactions. Based on the threshold comparisons one or more of the suggestions for the corrective actions 470 may be output via an alert, one of the dashboards 176 or other output mechanisms.

Figure 8:
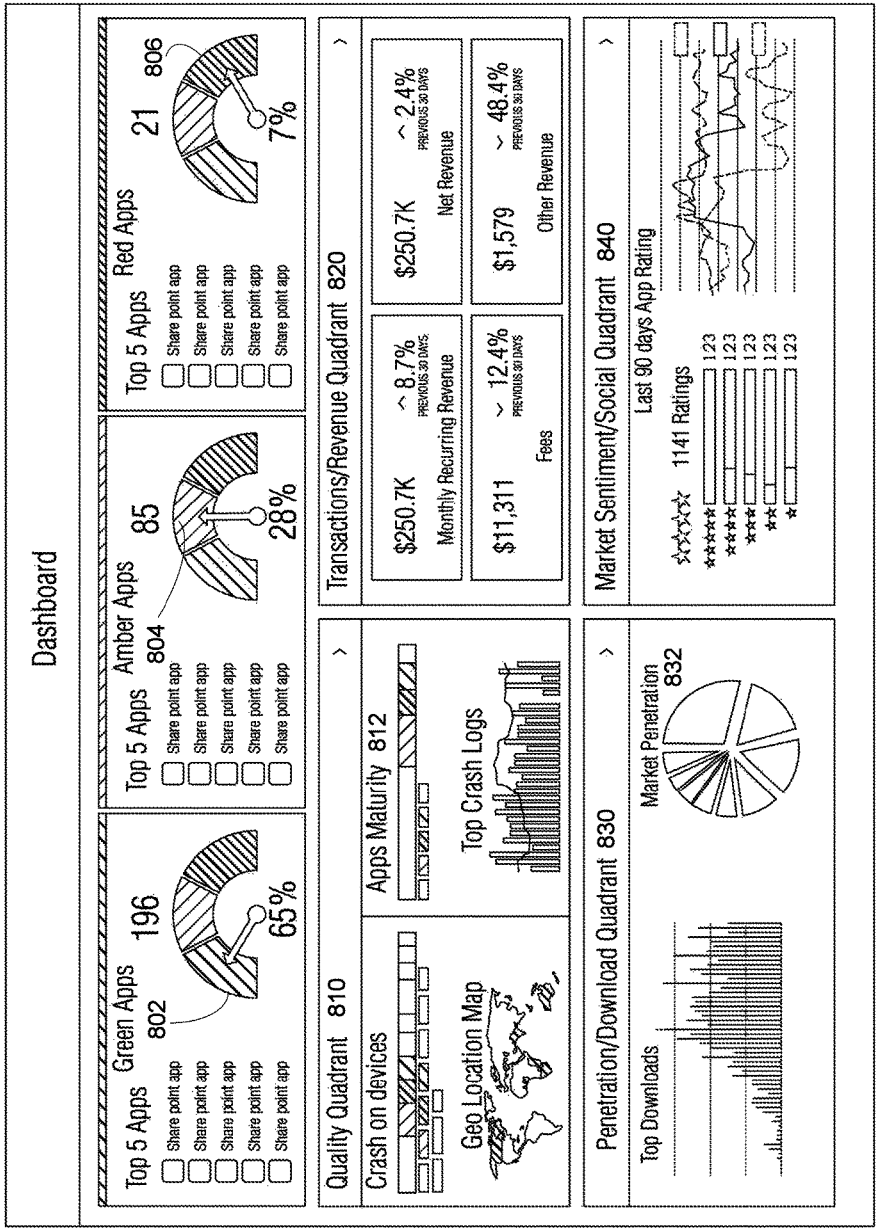
FIG. 8 shows an example of a dashboard generated in accordance with examples disclosed herein.

The visualizations of KPIs and other metrics at the portfolio level may be generated in one or more of the dashboards 176. FIG. 8 shows an example of a dashboard 800 generated in accordance with examples disclosed herein. The dashboard 800 can show a portfolio level view of one of the mobile applications portfolios 110, 112. A user may drill down to get additional details about each mobile application via for example, clicking on the corresponding graphics within the dashboards 176 or using other interactive elements provided on the dashboard 800. In FIG. 8, mobile apps are shown in green 802, amber 804, or red 806 categories based on performance. A user may specify KPIs, which may include metrics or values derived from metrics collected by the app catalog manager 162, and thresholds for KPIs. For example, to be in the green category, a mobile app should not have had a critical failure in the last 6 months. To be in the amber category, a mobile app should not have had a critical failure in the past 3 months, and to be in the red category, a mobile app should not have had a critical failure in the past 1 month. A critical failure may be defined by the user or within the mobile application portfolio management system 100 based on KPIs, and can include failures derived from crash logs.

Quality quadrants 810 are also shown, and include information about crashes for the mobile apps. Data for crashes may be shown based on aggregated data for devices and OSs, and based on geographic regions. Also, app maturity 812 may be shown and information for crash logs may be shown at the portfolio level. App maturity may be based on length of time since the last crash.

The transactions/revenue quadrant 820 shows examples of different types of revenue metrics that may be calculated for a portfolio. The fees may refer to maintenance fees for the mobile apps. The penetration/download quadrant 830 shows number of downloads over time for the entire portfolio, and the market penetration may be shown at 832 wherein the market penetration 832 is divided based on customer segment. The market sentiment/social quadrant 840 shows the customer sentiment for the mobile apps. The customer sentiment may be based on user ratings and/or can be derived based on sentiment analytics performed on user reviews and comments.

The portfolio level view of mobile app performance may be used for diagnostics, such as to identify causes of mobile app crashes. For example, a user may be responsible for different versions of a video on demand (VoD) mobile app that are deployed in different geographic regions. The mobile application portfolio management system 100 may capture performance metrics of the VoD mobile apps, and from the portfolio view, the user can ascertain that the mobile app is performing worse in a particular region and/or on a particular device when compared to other regions or devices. If it is a region-specific problem, then the crashes may be caused by region-specific features of the mobile app, such as language, or other region-specific features that are causing failures. An example of a region-specific cause of failure for the VoD mobile app is bandwidth. From the portfolio view, it may be determined that regions with less bandwidth are having worse performance, and a corrective action to modify the VoD mobile app for those regions to highlight low-resolution video options may be suggested.

Figure 9A:
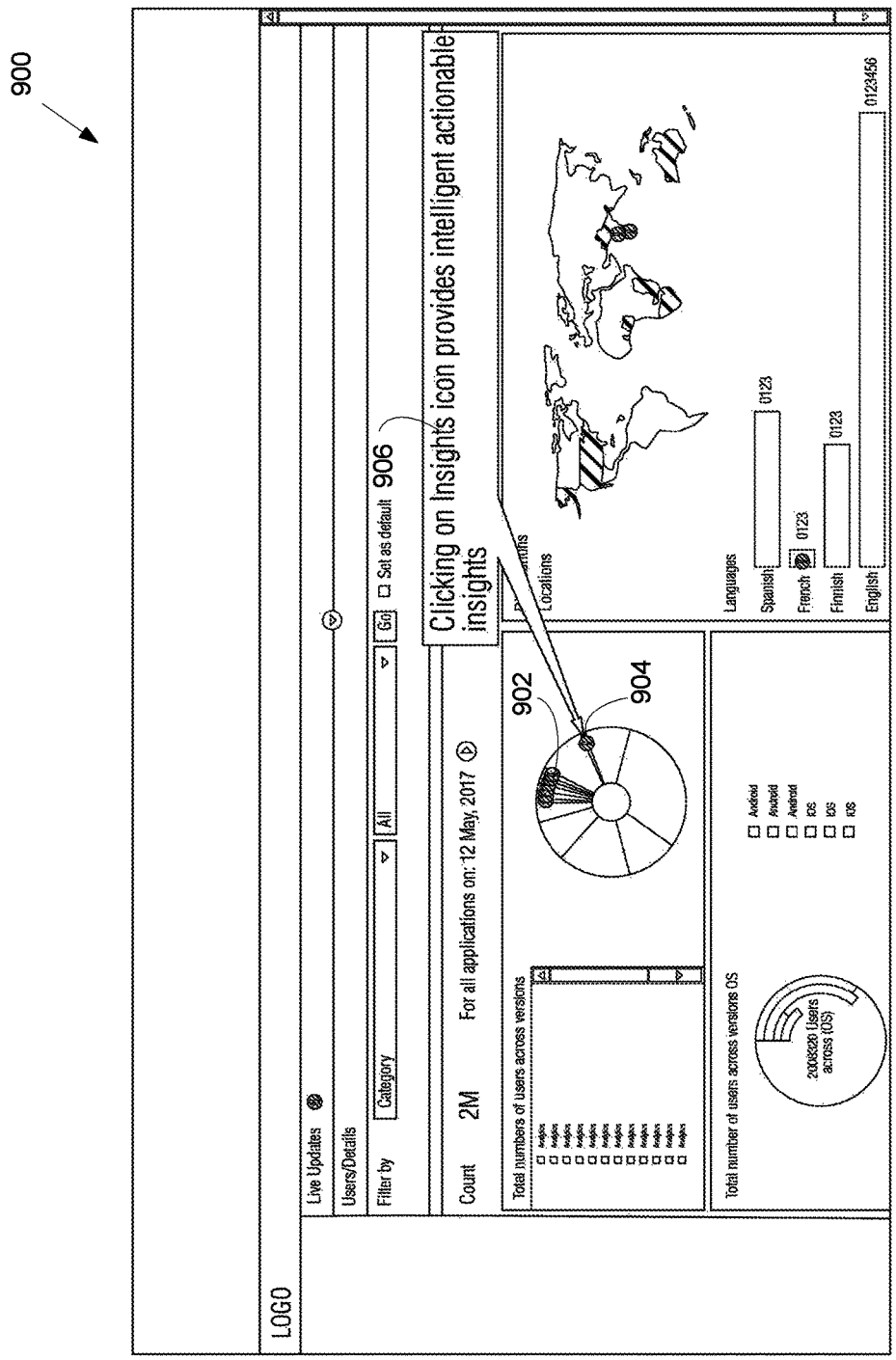
FIGS. 9A and 9B illustrate UIs that show consolidated views generated in accordance with examples disclosed herein for mobile applications in a mobile application portfolio.
Figure 9B:
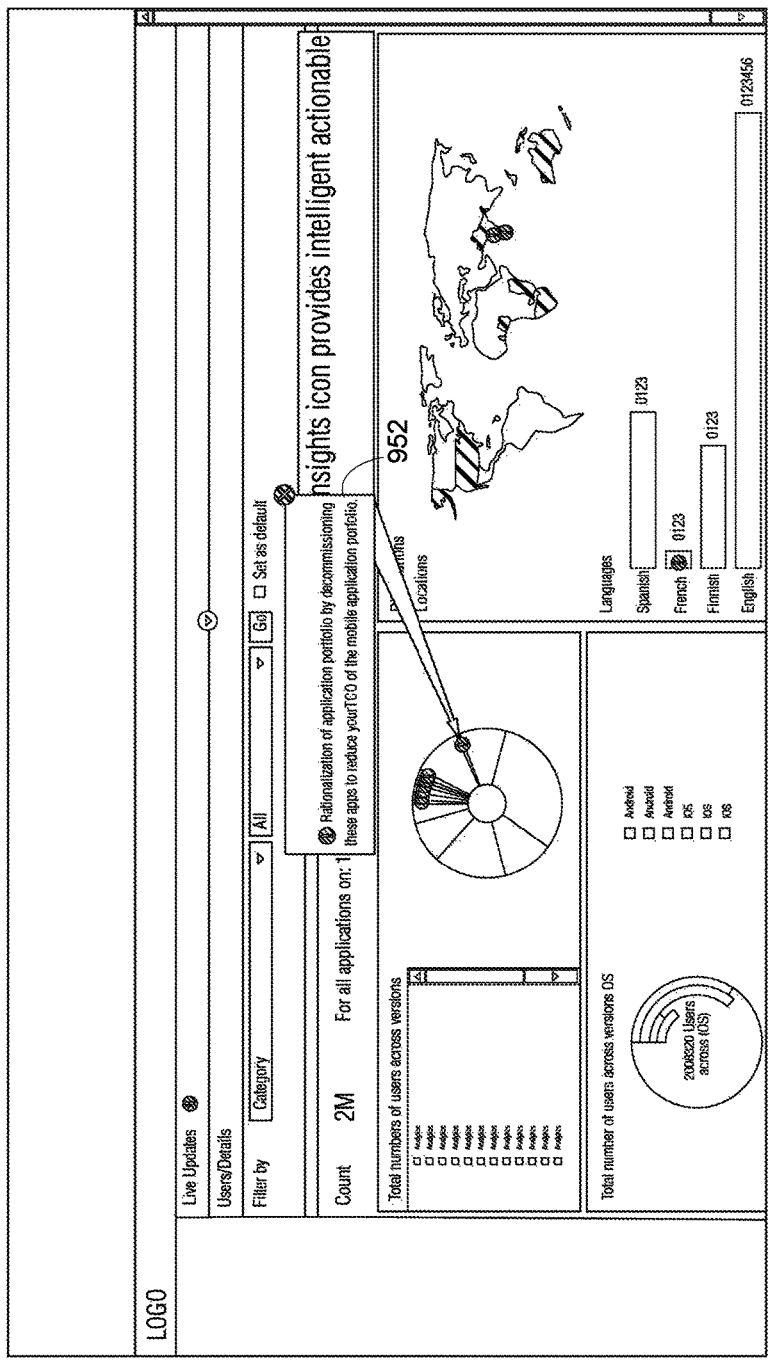

FIGS. 9A and 9B illustrate UIs 900 and 950 that show consolidated views generated in accordance with examples disclosed herein for mobile applications in a mobile application portfolio. In particular, the user interfaces 900 and 950 display an operating system wise distribution of mobile applications within some geographic regions. Based on the analysis of the application data and performance data of the mobile application portfolio, the mobile application portfolio management system 100 generated alerts which are conveyed to the user via a plurality of informational icons 902. Selection of an informational icon 904 causes a clickable callout 906 to be displayed which conveys that mobile application portfolio management system 100 has actionable insights or corrective actions or suggestions to a user viewing the UI 900. Clicking the callout 906 causes the UI 950 to be displayed. An actionable insight 952 is displayed that the mobile applications portfolio can be improved by decommissioning some of the mobile applications.

Figure 10:
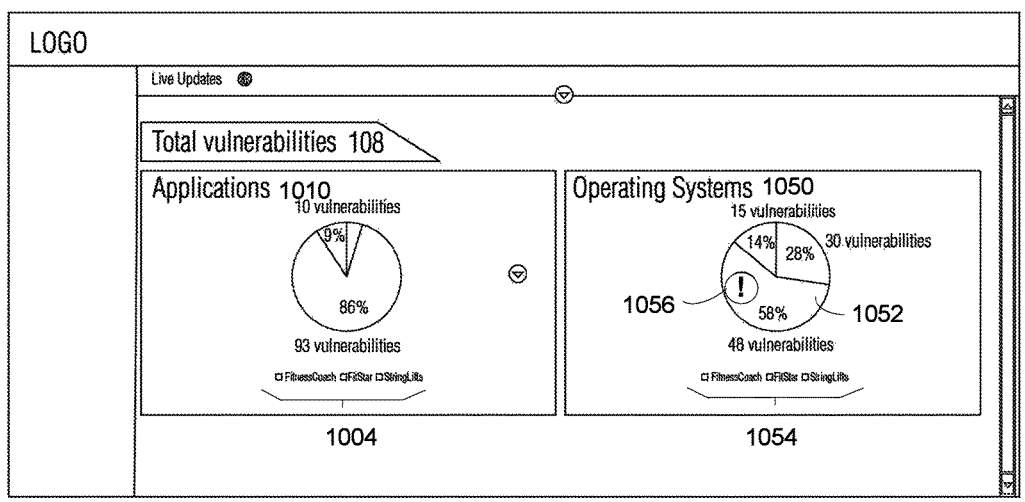
FIG. 10 shows a UI that shows security vulnerabilities within the three mobile apps of a mobile application portfolio.

FIG. 10 shows a UI 1000 that shows security vulnerabilities within the three mobile apps 1004 of a mobile application portfolio. The pie diagram 1010 shows that 10 security vulnerabilities were identified one application while 103 vulnerabilities were identified in another application of the three mobile applications under analysis. The pie diagram 1050 shows a drilled down version of the application with 103 vulnerabilities across the various operating systems 1054. It is noted that one particular version 1052 generated for one of the operating systems has 48 vulnerabilities which forms a large piece of vulnerabilities within the suite of mobile applications generated for different operating systems. Therefore, the table 480 may include suggestions towards improving the version for that particular operating system or for removing the mobile application so that the performance of the mobile application portfolio as a whole is improved. The suggestions may be conveyed to the user as an overlay which is displayed when the icon 1056 is clicked.

Figure 11:
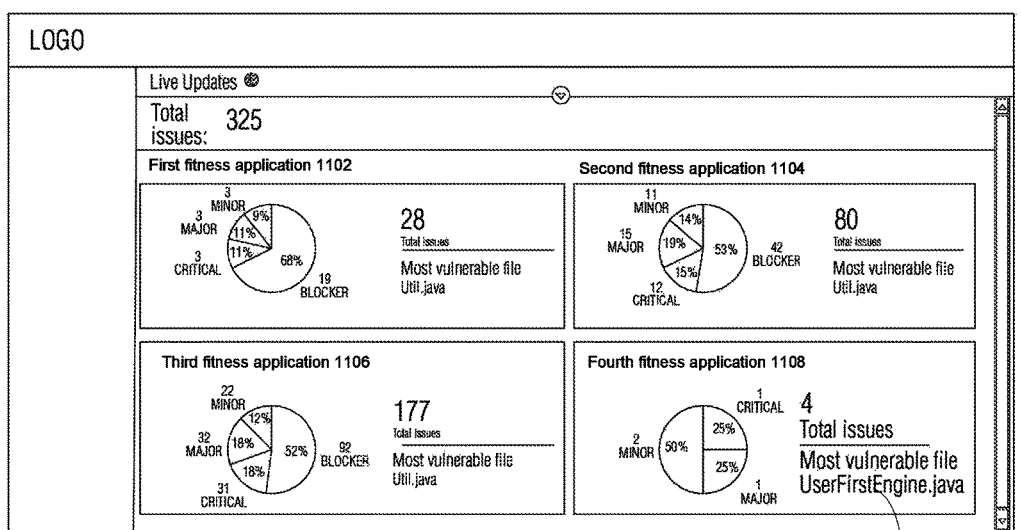
FIG. 11 shows an example app development view for a mobile application portfolio including four fitness applications.

FIG. 11 shows an app development view 1100 for a mobile application portfolio including four fitness applications. For the first fitness application 1102, a total of 28 issues were identified during the app development phase of which 3 issues were critical, 3 were major issues and 3 minor issues. In addition, the most vulnerable file 1112 where issues arise is also identified and displayed. Similar information is displayed for other fitness applications 1104, 1106 and 1108. The consolidated view 1100 enables a user to quickly identify the third fitness application 1106 as the most vulnerable application while the fourth fitness application 1104 is identified as the strongest application in terms of application performance issues. Drilling down further on the app development view 1100 allows a user to identify factors during the app development stage that may contribute to the mobile app having higher or lower performance. When analyzed by the mobile application portfolio management system 100 prior to their launch, it can be noted that while the first, and fourth fitness applications may be released in the app store, the second and the third fitness app may require more extensive testing and improvement. Therefore, a mobile application prior to being launched, can be subject to quality testing on the mobile application portfolio management system 100. This prevents mobile applications which are not yet ready for launch being released on the app store. For example, more detailed views on app development may lead the user to understand that certain tools were used in the development of the stronger fourth fitness app which were not used during the development of the weaker third fitness app. This can lead the user to require usage of certain development tools while coding a mobile application.

Figure 12:
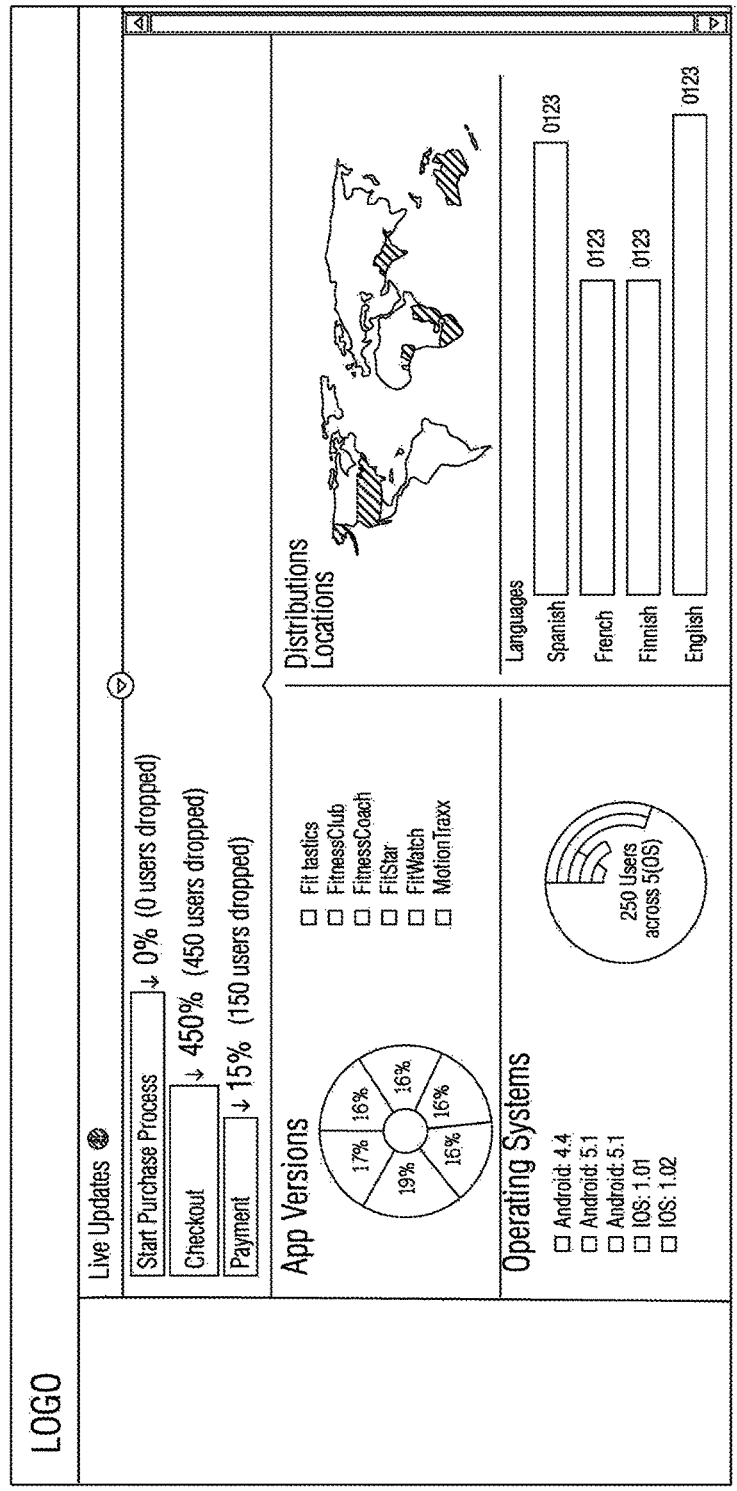
FIG. 12 illustrates an example UI which shows the details of a user funnel view.

FIG. 12 illustrates a UI 1200 which shows the details of a user funnel view. Converting an app store visitor into a customer is a major goal of any app developer. The conversion may happen in various transactions. For a retail app for example, the app store visitor may turn customer for in-app purchases, account activations, items viewed, items added to cart and credit card added. There are many factors that prevent an app store visitor from turning into a customer such as the time to load a page, the ease of transaction and the like. The UI shows that 0% of the users dropped during the start purchase process, 45% of the users dropped during the checkout process while 15% of the users dropped during the payments process. For each step, the mobile application portfolio management system 100 may identify various issues that are causing the app users to drop out. For example, the Add To Cart page may take 3 minutes to load causing the users to abandon the transactions. In-App purchases may require 5 clicks or it may be a 5 step process which can lead to confusion thereby discouraging the user from completing the transaction. By analyzing the above data, the mobile application portfolio management system 100 may provide corrective actions to improve app performance during each process.

Figure 13:
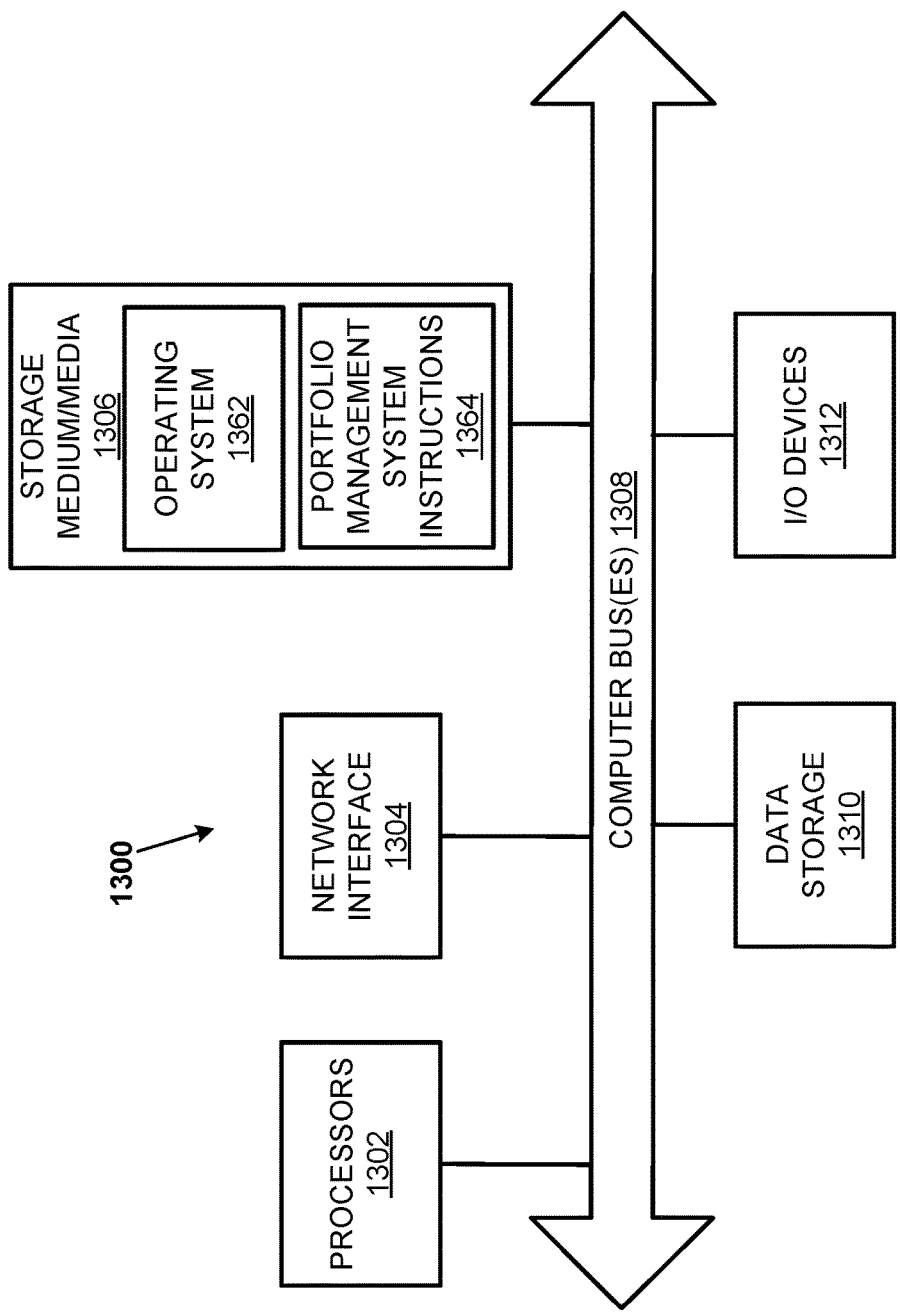
FIG. 13 illustrates a computer system that may be used to implement the mobile application portfolio management system.

FIG. 13 illustrates a computer system 1300 that may be used to implement the mobile application portfolio management system 100. More particularly, computing machines such as desktops, laptops, smartphones, tablets and wearables which may be used to execute the mobile application portfolio management system 100 or display the dashboards 176 may have the structure of the computer system 1300. The computer system 1300 may include additional components not shown and that some of the components described may be removed and/or modified.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.13x LAN, a 3G or 4G mobile WAN or a WiMax WAN, and a computer-readable medium 1306. Each of these components may be operatively coupled to a bus 1308. The computer-readable medium 1306 may be any suitable medium which participates in providing instructions to the processor(s) 1302 for execution. For example, the computer-readable medium 1306 may be non-transitory or non-volatile medium, such as a magnetic disk or solid-state non-volatile memory or volatile medium such as RAM. The instructions or modules stored on the computer-readable medium 1306 may include machine-readable instructions 1364 executed by the processor(s) 1302 to perform the methods and functions of the mobile application portfolio management system 100.

The mobile application portfolio management system 100 may be implemented as software stored on a non-transitory computer-readable medium and executed by one or more processors. For example, the computer-readable medium 1306 may store an operating system 1362, such as MAC OS, MS WINDOWS, UNIX, or LINUX, and code 1364 for the mobile application portfolio management system 100. The operating system 1362 may be multi-user, multiprocessing, multitasking, multithreading, real-time and the like. For example, during runtime, the operating system 1362 is running and the code for the mobile application portfolio management system 100 is executed by the processor(s) 1302.

The computer system 1300 may include a data storage 1310, which may include non-volatile data storage. The data storage 1310 stores any data used by the mobile application portfolio management system 100. The data storage 1310 may be used to store real-time data from the KPI values 250, the table 480, application data 222 and performance data 224 and the like.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A mobile application portfolio management system comprising:
   a data storage that stores at least application data and performance data for a mobile application portfolio;
   at least one processor that executes machine readable instructions stored in a non-transitory computer readable medium, the machine readable instructions comprising instructions that cause the at least one processor to:
   receive the application data and the performance data from a plurality of mobile applications included in a mobile application portfolio hosted on at least one application server and downloadable by a plurality of user devices;
   calculate a plurality of key performance indicators (KPIs) from one or more of the application data and the performance data at at least one of a plurality of levels, the plurality of levels for the plurality of KPIs including portfolio-level KPIs defined for the mobile application portfolio and application level KPIs defined for each of the plurality of mobile applications, where the plurality of KPIs at the application level include factors during application development stage of each of the mobile applications that contribute to the performance of the mobile application portfolio;
   summarize each of the plurality of KPIs for unique attribute combinations that include at least an organization id (ORG ID) for the portfolio level KPIs and an application id (APP ID) for application level KPIs;
   compare the summarized KPIs with respective KPI thresholds;
   identify one or more of the KPIs that have subpar performance when compared with the respective KPI thresholds;
   isolate elements of the KPIs with subpar performances that do not meet respective element thresholds;
   determine corrective actions to improve at least a subset of the one or more KPIs having subpar performance;
   determine further corrective actions that improve performance of the mobile application portfolio, the further corrective actions including decommissioning of at least one mobile application of the plurality of mobile applications from the mobile application portfolio wherein the at least one mobile application is associated with one of the KPIs having subpar performance;
   generate alerts for the one or more KPIs with subpar performances, the alerts including the corrective actions; and
   cause a display of the summarized KPIs, the corrective actions, and an application development view that includes the factors that contribute to the performance of the mobile application portfolio via one or more dashboards.

2. The mobile application portfolio management system of claim 1, the machine readable instructions for receiving performance data further comprising instructions that cause the at least one processor to:
   receive the application data and the performance data from a plurality of data sources comprising at least an analytical tool that monitors performance of at least a subset of the plurality of mobile applications.

3. The mobile application portfolio management system of claim 1, the machine readable instructions for summarizing the KPIs further comprising instructions that cause the at least one processor to:
   determine trends in the KPIs of the plurality of mobile applications using statistical techniques.

4. The mobile application portfolio management system of claim 3, the machine readable instructions for determining trends further comprising instructions that cause the at least one processor to:
   determine positive and negative trends in user sentiments for the plurality of mobile applications via employing one or more of natural language processing (NLP) techniques and sentiment analysis for processing user reviews for the plurality of mobile applications.

5. The mobile application portfolio management system of claim 4, the machine readable instructions for determining trends further comprising instructions that cause the at least one processor to:
   identify one or more of the plurality of KPIs for user reviews via employing Natural Language Processing (NLP) techniques on the user reviews.

6. The mobile application portfolio management system of claim 1, wherein the plurality of KPIs comprise at least code quality, application security vulnerabilities, application performance and application user experience score.

7. The mobile application portfolio management system of claim 1, wherein the machine readable instructions further comprising instructions that cause the at least one processor to:
   access rules associated with each of the plurality of KPIs; and
   determine the respective KPI thresholds for each of the plurality of KPIs based on the rules.

8. The mobile application portfolio management system of claim 7, wherein the machine readable instructions to isolate elements of the KPIs with subpar performances further comprising instructions that cause the at least one processor to:
   extract the elements of the KPIs via analyzing the KPIs; and
   compare the elements of the KPIs with respective element thresholds.

9. The mobile application portfolio management system of claim 8, wherein the machine readable instructions to determine the corrective actions further comprising instructions that cause the at least one processor to:
   access a table that maps the elements of the KPIs with respective element thresholds and the corrective actions to improve performance of the mobile application portfolio.

10. The mobile application portfolio management system of claim 1, wherein the machine readable instructions for causing a display of the summarized KPIs further comprising instructions that cause the at least one processor to:

grade the plurality of mobile applications into one of green apps, amber apps and red apps.

11. The mobile application portfolio management system of claim 1, wherein the plurality of mobile apps include at least one Internet of Things (IoT) app that communicates with at least one networked device and wherein the application level KPIs comprise at least a number of IoT devices in communication with the IoT app, a number of functions configured into the IoT app that control the IoT devices, performance of the IoT app with respect to each of the functions and data collected by the IoT app from the networked devices.

12. The mobile application portfolio management system of claim 1, wherein the factors include one or more tools used during application development stage of the at least one mobile application.

13. A method of managing a mobile application portfolio comprising:
receiving application data and performance data of a plurality of mobile applications comprised in the mobile application portfolio from a plurality of data sources wherein the mobile application portfolio is hosted on at least one application server and downloadable by a plurality of user devices;
storing the received data within a reporting database;
calculating a plurality of KPIs from one or more of the application data and the performance data for the mobile application portfolio at one or more of a plurality of levels that include portfolio-level KPIs defined for the mobile application portfolio and application level KPIs defined for each of the plurality of mobile applications, wherein the plurality of KPIs are calculated based on a ORG ID associated with an entity managing the mobile application portfolio and the plurality of KPIs at the application level include factors during application development stage of each of the mobile applications that contribute to the performance of the mobile application portfolio;
comparing the plurality of KPIs with respective KPI thresholds;
identifying one or more of the plurality of KPIs that underperform the respective KPI thresholds;
accessing a table that includes information regarding the plurality of KPIs, the respective KPI thresholds and one or more corrective actions mapped to one or more of the plurality of KPIs;
retrieving corrective actions for improving performance of at least one of the one or more underperforming KPIs and the mobile application portfolio from the table;
configuring one or more dashboards to display one or more information icons indicative of at least one of the one or more underperforming KPIs wherein upon a user selection of at least one of the informational icons an overlay including the corrective actions is displayed wherein the corrective actions include at least decommissioning a mobile application of the plurality of mobile applications in the mobile application portfolio wherein the at least one mobile application is associated with the underperforming KPIs; and
causing, via the one or more dashboards, a display of the plurality of KPIs for the mobile application portfolio and an application development view that includes the factors contributing to the performance of the mobile application portfolio.

14. The method of claim 13, wherein the plurality of KPIs are indicative of performance of the mobile application portfolio for a plurality of metrics.

15. The method of claim 13, wherein receiving application data and performance data from a plurality of data sources further comprises:
receiving the application data and the performance data from at least one third-party analytical tool that analyzes performance of at least one of the plurality of mobile applications.

16. The method of claim 13, wherein receiving application data and performance data from a plurality of data sources further comprises:
receiving the application data and the performance data from at least one mobile agent compiled into an instance of one of the plurality of mobile applications installed on a user device.

17. The method of claim 13, wherein identifying one or more of the plurality of KPIs that underperform the respective KPI thresholds further comprises:
identifying a subset of the plurality of mobile applications from the mobile application portfolio associated with the one or more KPIs underperforming the respective KPI thresholds.

18. A non-transitory computer-readable storage medium comprising machine-readable instructions that cause a processor to:
receive application data and performance data from a plurality of mobile applications included in a mobile application portfolio hosted on at least one application server and downloadable by a plurality of user devices;
calculate a plurality of key performance indicators (KPIs) from one or more of application data and the performance data at at least one of a plurality of levels, the plurality of levels for the plurality of KPIs including portfolio-level KPIs defined for the mobile application portfolio and application level KPIs defined for each of the plurality of mobile applications, where the plurality of KPIs at the application level include factors during application development stage of each of the mobile applications that contribute to the performance of the mobile application portfolio;
summarize each of the plurality of KPIs for unique attribute combinations that include at least an organization id (ORG ID) for the portfolio level KPIs and an application id (APP ID) for application level KPIs;
compare the summarized KPIs with respective KPI thresholds;
identify one or more of the KPIs that have subpar performance when compared with the respective KPI thresholds;
isolate elements of the KPIs with subpar performances that do not meet respective element thresholds;
determine corrective actions to improve at least a subset of the one or more KPIs having subpar performance;
determine further corrective actions that improve performance of the mobile application portfolio, the further corrective actions including decommissioning of at least one mobile application of the plurality of mobile applications from the mobile application portfolio wherein the at least one mobile application is associated with the KPIs that have subpar performance;
generate alerts for the one or more KPIs with subpar performances, the alerts including the corrective actions; and
cause a display of the summarized KPIs, the corrective actions and an application development view that includes the factors that contribute to the performance of the mobile application portfolio via one or more dashboards.

19. The non-transitory computer-readable storage medium of claim 18, wherein the instructions to cause a display of the summarized KPIs via the dashboards further comprising machine-readable instructions that cause a processor to:
    cause a display of one or more informational icons indicative of at least one of the KPIs having subpar performance within the dashboard such that an overlay including one of the corrective actions is displayed upon selection of at least one of the informational icons.

\* \* \* \* \*

UNITED STATES PATENT AND TRADEMARK OFFICE
CERTIFICATE OF CORRECTION

PATENT NO. : 10,353,799 B2  
APPLICATION NO. : 15/693079  
DATED : July 16, 2019  
INVENTOR(S) : Raghu Polisetty et al.

Page 1 of 1

It is certified that error appears in the above-identified patent and that said Letters Patent is hereby corrected as shown below:

On the Title Page

Item (30), Foreign Application Priority Data "201641010088" should be "201641040088".

Signed and Sealed this  
Twenty-seventh Day of August, 2019

Andrei Iancu  
*Director of the United States Patent and Trademark Office*